(12) United States Patent
Cui et al.

(10) Patent No.: US 11,163,075 B1
(45) Date of Patent: Nov. 2, 2021

(54) X-RAY ATTENUATION SPECTROMETER

(71) Applicant: GEORGETOWN RAIL EQUIPMENT COMPANY, Georgetown, TX (US)

(72) Inventors: Shuang Cui, Georgetown, TX (US); Jeb Everett Belcher, Georgetown, TX (US)

(73) Assignee: LORAM TECHNOLOGIES, INC., Georgetown, TX (US)

(*) Notice: Subject to any disclaimer, the term of this patent is extended or adjusted under 35 U.S.C. 154(b) by 0 days.

(21) Appl. No.: 16/988,974

(22) Filed: Aug. 10, 2020

(51) Int. Cl.
*G01T 1/20* (2006.01)
*G01N 23/225* (2018.01)
*G01T 1/36* (2006.01)

(52) U.S. Cl.
CPC .......... *G01T 1/362* (2013.01); *G01N 23/225* (2013.01); *G01T 1/2002* (2013.01)

(58) Field of Classification Search
CPC ...... G01N 23/225; G01T 1/2002; G01T 1/362
See application file for complete search history.

(56) References Cited

U.S. PATENT DOCUMENTS 10,976,273 B2 * 4/2021 Yun .................. H01J 35/14
2019/0187076 A1 * 6/2019 Filsinger .............. G01N 23/223
2019/0369271 A1 * 12/2019 Yun ..................... G01T 1/36

OTHER PUBLICATIONS

Yannick Poirier et al; A simplified approach to characterizing a kilovoltage source spectrum for accurate dose computation dated Jun. 2012.

* cited by examiner

*Primary Examiner* — Mark R Gaworecki
(74) *Attorney, Agent, or Firm* — Parsons Behle & Latimer

(57) ABSTRACT

An x-ray spectrometer includes a radiation path and a plurality of layer groups oriented along the radiation path. The radiation path extends from a start point to an end point. The layer groups each include an attenuation layer, a scintillation layer, and a light diffuser layer. The light diffuser layer directs light emitted from the scintillation layer away from the radiation path. A linear diode array is positioned to measure the redirected light and generate a signal representing the penetration characteristics of the beam of radiation throughout the layer groups.

27 Claims, 4 Drawing Sheets

X-RAY ATTENUATION SPECTROMETER

FIELD OF THE DISCLOSURE

The embodiments described herein relate to systems and methods for conducting x-ray spectrometry. More particular, the embodiments described herein relate to an x-ray spectrometer and methods for determine the energy properties of x-ray beams.

BACKGROUND

Description of the Related Art

Applications throughout many fields utilize x-rays to assess, inspect or examine the internal regions of an object or target. Most x-ray beams are high-intensity sources of radiation. Radiation energy travels in a straight line and loses energy as it travels through material interacting with the material's atoms. Each time radiation strikes an atom of a material it either passes through, is absorbed, or is scattered as a result of the collision. The intensity of the radiation is reduced by each atom it encounters. However, the amount of energy reduction and how much is scattered, absorbed, or passes straight through the target is dependent on the type of radiation and atomic properties of the material.

In some applications, it is necessary to know the amount of energy that is being emitted. A half-value layer (HVL) is the amount (thickness) of a given material needed to reduce the radiation emissivity by one-half its value. The HVL is calculated by the formula $$HVL = \text{Log}\left[\frac{I_0}{I_x}\right] / \text{Log}[2],$$

where $I_0$ is the original intensity of the radiation and $I_x$ is the attenuated intensity of the radiation.

For purposes of quality control, it may be desirable to measure the HVL and peak tube potential (kVp) in order to compute an x-ray dosing in a clinical, calibration, or testing setting. However, the HVL and kVp may not be independent parameters since higher energy beams are more penetrating.

Because x-ray beams are high-intensity sources of radiation, it may be difficult to measure its spectra directly. Instead, the penetration characteristics of the x-ray spectra may be measured to determine the energy properties of the x-ray beams. FIG. 4 illustrates a known method of measuring the penetration characteristics of an x-ray spectra. X-rays 15 with an initial intensity 11 are emitted from an x-ray source 10 towards a detector 60. Next, a first sheet 20 of a material with a high-attenuation coefficient is placed between the x-ray source 10 and the detector 60. A portion 25 of the x-rays 15 is transmitted through the first sheet 20 and the detector 60 records a first attenuated intensity 21 of this portion 25. A second sheet 30 of a material with a high-attenuation coefficient is then placed between the x-ray source 10 and the detector 60. A portion 35 of the x-rays 15 is transmitted through the first sheet 20 and the second sheet 30 and the detector 60 records a second attenuated intensity 31 of this portion 35. This practice is repeated. For instance, as illustrated in FIG. 4, a third attenuated intensity 41 of a portion 45 of the x-rays 15 further transmitted through a third sheet 40 may be recorded, and a fourth attenuated intensity 51 of a portion 55 of the x-rays 15 further transmitted through a fourth sheet 50 may be recorded. FIG. 5 shows a graph of the HVL in relation to the ratio of the initial intensity $I_0$ to the attenuated intensity $I_x$. This method requires sheets to be stacked manually between each recording. For example, if four layers of sheet materials were used to calculate the spectra, four separate recordings will take place while the number of sheet materials is increased. This process usually takes up to a few hours to complete.

SUMMARY

The present disclosure is directed to an x-ray spectrometer and methods for conducting x-ray spectrometry that overcomes and/or mitigates some of the problems and disadvantages discussed above. The embodiments described herein reduce the time needed to measure the penetration characteristics of an x-ray spectra.

An embodiment of an x-ray spectrometer includes a plurality of attenuation layers, a plurality of scintillation layers, a plurality of light diffuser layers, and one or more cameras. Radiation that passes through each of the plurality of attenuation layers interacts with a respective one of the plurality of scintillation layers and emits a light that is redirected by a respective one of the plurality of light diffuser layers. The one or more cameras are positioned to measure light emitted from each of the plurality of scintillation layers and redirected by the plurality of light diffuser layers. The one or more cameras may be a linear diode array positioned to measure light redirected by each of the plurality of light diffuser layers.

The plurality of scintillation layers may be at least eight scintillation layers. The plurality of attenuation layers may be at least eight attenuation layers. The plurality of light diffuser layers may be at least eight light diffuser layers. The plurality of scintillation layers may be twelve or less scintillation layers. The plurality of attenuation layers may be twelve or less attenuation layers. The plurality of light diffuser layers may be twelve or less light diffuser layers.

The plurality of attenuation layers may include a first attenuation layer that is not directly adjacent to any of the plurality of light diffuser layers. The first attenuation layer may be configured to reduce an intensity of radiation to a level below a saturation threshold of a scintillation layer of the plurality of scintillation layers that is adjacent to the first attenuation layer. The first attenuation layer may have a greater linear attenuation coefficient than the other layers of the plurality of attenuation layers. The first attenuation layer may have a greater thickness than the other layers of the plurality of attenuation layers. The first attenuation layer may be interchangeable with a shielding layer having a greater thickness than each of the plurality of attenuation layers.

Each of the plurality of light diffuser layers may include a first face, a second face, and a side. The first face is oriented towards an adjacent one of the plurality of scintillation layers. The second face is oriented away from the adjacent one of the plurality of scintillation layers. The second face is opposite the first face. Light from the adjacent one of the plurality of scintillation layers may be redirected through the side of the light diffuser layer. The light from the adjacent one of the plurality of scintillation layers may be redirected through the side of the light diffuser layer at approximately 90 degrees from the first face of the light diffuser layer.

An embodiment of an x-ray spectrometer includes a radiation path, a first layer group, a second layer group, and a third layer group. The radiation path extends from a start point to an end point. The first layer group is oriented along the radiation path. The first layer group includes a first scintillation layer and a first light diffuser layer. The first scintillation layer is closer to the start point than the first light diffuser layer. The first light diffuser layer is configured to direct light emitted from the first scintillation layer away from the radiation path.

The second layer group is oriented along the radiation path. The second layer group includes a second attenuation layer, a second scintillation layer, and a second light diffuser layer. The second attenuation layer is closer to the start point than the second scintillation layer. The second scintillation layer is closer to the start point than the second light diffuser layer. The first layer group is closer to the start point than the second layer group. The second light diffuser layer is configured to direct light emitted from the second scintillation layer away from the radiation path.

The third layer group is oriented along the radiation path. The third layer group includes a third attenuation layer, a third scintillation layer, and a third light diffuser layer. The third attenuation layer is closer to the start point than the third scintillation layer. The third scintillation layer is closer to the start point than the third light diffuser layer. The second layer group is closer to the start point than the third layer group. The third light diffuser layer is configured to direct light emitted from the third scintillation layer away from the radiation path.

The x-ray spectrometer may include one or more cameras positioned to measure light redirected by the first light diffuser layer, light redirected by the second light diffuser layer, and light redirected by the third light diffuser layer. The one or more cameras may be a linear diode array positioned to measure light redirected by the first light diffuser layer, light redirected by the second light diffuser layer, and light redirected by the third light diffuser layer.

The first layer group may include a first attenuation layer closer to the start point than the first scintillation layer. The first attenuation layer may be interchangeable with another first attenuation layer having a greater thickness than the first attenuation layer. The first light diffuser layer may be configured to redirect light more than 45 degrees away from the radiation path. The first light diffuser layer may be configured to redirect light perpendicular to the radiation path.

An embodiment of a method of conducting x-ray spectrometry includes aligning a beam of radiation along a radiation path and attenuating the beam of radiation by interaction with a plurality of attenuation layers to form a plurality of attenuated beams along the radiation path. The plurality of attenuated beams are sequentially attenuated such that a prior attenuated beam of radiation of the plurality of attenuated beams is further attenuated by a respective one of the plurality of attenuation layers to produce a subsequent attenuated beam of radiation of the plurality of attenuated beams. The method includes passing the plurality of attenuated beams through a plurality of scintillation layers. Each of the plurality of attenuated beams passes through a respective one of the plurality of scintillation layers. The plurality of scintillation layers emit a plurality of lights. Each of the plurality of lights are emitted by a respective one of the plurality of scintillation layers. The method includes measuring a respective intensity of each of the plurality of lights.

The respective intensity of each of the plurality of lights may be measured without moving the plurality of attenuation layers. The respective intensity of each of the plurality of lights may be measured simultaneously. The respective intensity of each of the plurality of lights may be measured simultaneously with a linear diode array. The plurality of attenuation layers may be at least eight attenuation layers and the method may include measuring at least eight intensities of lights emitted by the plurality of scintillation layers. A thickness of each of the plurality of attenuation layers may be uniform.

The method may include directing each of the plurality of lights away from the radiation path. Each of the plurality of lights may be directed away from the radiation path via a respective light diffuser layer.

The method may include passing the beam of radiation through an initial scintillation layer before attenuating the beam of radiation by interaction with the plurality of attenuation layers and shielding the initial scintillation layer from the beam of radiation such that an intensity of the beam of radiation received by the initial scintillation layer is below a saturation threshold of the initial scintillation layer.

The method may include attenuating further a last attenuated beam of radiation of the plurality of attenuated beams by interaction with a final attenuation layer and measuring an intensity of radiation transmitted through the final attenuation layer aligned with the radiation path.

Figure 1:
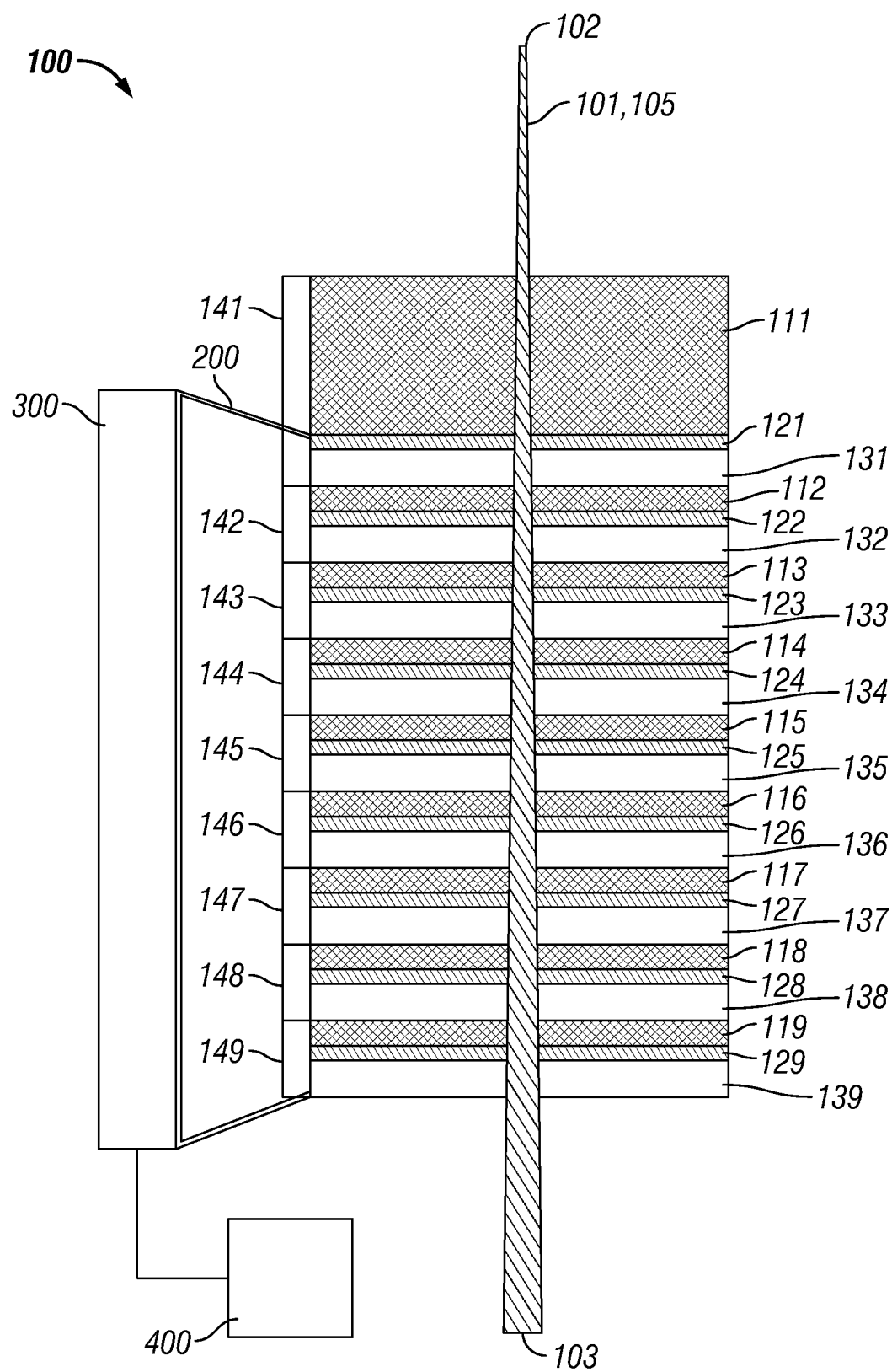
FIG. 1 shows an embodiment of an x-ray spectrometer.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DESCRIPTION

FIG. 1 shows an embodiment of an x-ray spectrometer 100. The x-ray spectrometer 100 includes a radiation path 101 that extends linearly from a start point 102 to an end point 103. A beam of radiation 105 extends along the radiation path 101 in the direction of the end point 103. For purposes of illustration only, the beam of radiation 105 at the start point 102 is shown smaller than the beam of radiation 106 at the end point 103. In some instances, the beam of radiation 105 at the start point 102 is equal to or larger than the beam of radiation 106 at the end point 103. The x-ray spectrometer 100 includes a plurality of attenuation layers 111-119 (referred to collectively as an attenuation layer 110 (best shown in FIG. 2)), a plurality of scintillation layers 121-129 (referred to collectively as a scintillation layer 120 (best shown in FIG. 2)), and a plurality of light diffuser layers 131-139 (referred to collectively as a light diffuser layer 130 (best shown in FIG. 2)) positioned along the radiation path 101. The attenuation layers 110 may be a lead sheet. The plurality of attenuation layers 111-119, plurality of scintillation layers 121-129, and plurality of light diffuser layers 131-139 are oriented in layer groups 141-149 (referred to collectively as a layer group 140 (best shown in FIG. 2)).

Figure 2:
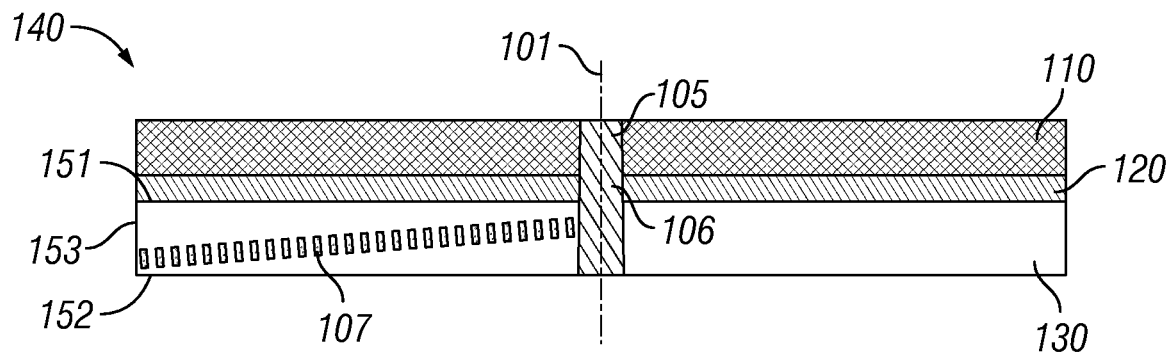
FIG. 2 shows a detailed view of an embodiment of a layer group of an x-ray spectrometer.

FIG. 2 shows a detailed view of an embodiment of a layer group 140 comprised of an attenuation layer 110, a scintillation layer 120, and a light diffuser layer 130. A portion of the beam of radiation 105 is received by the attenuation layer 110. As the beam of radiation 105 is received through the attenuation layer 110, its intensity is lessened and the beam of radiation 105 becomes an attenuated beam of radiation 106. The attenuated beam of radiation 106 interacts with the scintillation layer 120 and emits a light 107. The light 107 is then redirected by the light diffuser layer 130. The light diffuser layer 130 includes a first face 151, a second face 152, and a side 153. The first face 151 is oriented towards the scintillation layer 120. The second face 152 is oriented away from the scintillation layer 120 and is opposite the first face 151. The side 153 extends between the first face 151 and the second face 152 and is not aligned with the radiation path 101. The side 153 may or may not be parallel to the first face 151 or the second face 152. The light 107 may be redirected through the side 153 of the light diffuser layer 130 to be measured. In some embodiments, the light 107 may be measured closer to the radiation path 101. The light 107 may be redirected through the side 153 of the light diffuser layer 130 at approximately 90 degrees from the first face 151 of the light diffuser layer 130. The light 107 may be redirected perpendicular to the radiation path 101. The light diffuser layer 130 may redirect the light 107 more than 45 degrees away from the radiation path 101. The attenuated beam of radiation 106 passes through the light diffuser layer 130 and towards another layer group 140 (not shown in FIG. 2).

Referring again to FIG. 1, nine layer groups 141-149 are shown. In some embodiments, the x-ray spectrometer 100 may include at least eight layer groups. The x-ray spectrometer 100 may include twelve or less layer groups.

The first layer group 141 includes a first scintillation layer 121 and a first light diffuser layer 131. The first scintillation layer 121 is closer to the start point 102 than the first light diffuser layer 131. The first light diffuser layer 131 is configured to direct light emitted from the first scintillation layer away 121 from the radiation path 101.

The first layer group 141 may include a first attenuation layer 111. The first attenuation layer 111 may not be directly adjacent to any of the light diffuser layers 130. In some embodiments, the first attenuation layer 111 may be omitted so long as the level of radiation received does not oversaturate the first scintillation layer 121. In some embodiments, the first attenuation layer 111 may be configured to reduce an intensity of radiation of the beam of radiation 105 to a level below a saturation threshold of the first scintillation layer 121. The first attenuation layer 111 may be made of a material with a greater linear attenuation coefficient than the other attenuation layers 110. The first attenuation layer 111 may have a greater thickness than the other attenuation layers 110. The thicknesses of the attenuation layers 110, other than the first attenuation layer 111, may be uniform. The first attenuation layer 111 may be interchangeable within a frame of the x-ray spectrometer 100 with a shielding layer having a greater thickness than each of the plurality of attenuation layers 110. In some embodiments, the first attenuation layer 111 may have a thickness of between ⅛-¼ inches (3.175-6.35 mm) and the other attenuation layers 110 may have a thickness of ¹⁄₁₆ inches (1.5875 mm).

The second layer group 142 includes a second attenuation layer 112, a second scintillation layer 122, and a second light diffuser layer 132. The second attenuation layer 112 is closer to the start point 102 than the second scintillation layer 122. The second scintillation layer 122 is closer to the start point 102 than the second light diffuser layer 132. The first layer group 141 is closer to the start point 102 than the second layer group 142. The second light diffuser layer 132 is configured to direct light emitted from the second scintillation layer 122 away from the radiation path 101.

The third layer group 143 includes a third attenuation layer 113, a third scintillation layer 123, and a third light diffuser layer 133. The third attenuation layer 113 is closer to the start point 102 than the third scintillation layer 123. The third scintillation layer 123 is closer to the start point than the third light diffuser layer 133. The second layer group 142 is closer to the start point 102 than the third layer group 143. The third light diffuser layer 133 is configured to direct light emitted from the third scintillation layer 123 away from the radiation path 101.

The fourth layer group 144, fifth layer group 145, sixth layer group 146, seventh layer group 147, eighth layer group 148, and ninth layer group 149 each include a respective attenuation layer 114, 115, 116, 117, 118, 119; a respective scintillation layer 124, 125, 126, 127, 128, 129; and a respective light diffuser layer 134, 135, 136, 137, 138, 139. The third layer group 143 is closer to the start point 102 than the fourth layer group 144, which is closer to the start point 102 than the fifth layer group 145, which is closer to the start point 102 than the sixth layer group 146, which is closer to the start point 102 than the seventh layer group 147, which is closer to the start point 102 than the eighth layer group 148, which is closer to the start point 102 than the ninth layer group 149. In some embodiments, the light diffuser layer 130 (ninth light diffuser layer 139 shown in FIG. 1) closest to the end point 103 may be omitted.

The x-ray spectrometer 100 includes one or more cameras positioned to measure light emitted from the scintillation layers 120 and redirected by the light diffuser layers 130. The x-ray spectrometer 100 may include a camera for each light diffuser layers 130. The one or more cameras may be positioned at a side 153 (shown in FIG. 2) of each of the light diffuser layers 130. In some embodiments, the one or more cameras may be a linear diode array 300, such as a single linear diode array. The linear diode array 300 may be used to simultaneously measure the respective intensities of the lights emitted by the scintillation layers 120. The x-ray spectrometer 100 may include a media 200 between the light diffuser layers 130 and the linear diode array 300 to direct the light from the light diffuser layers 130 into the linear diode array 300. The linear diode array 300 includes an array of photodiode modules. The photodiode modules may be laminated with a scintillation screen to create x-ray sensitive diodes. The scintillation screen converts photon energy emitted by an x-ray source into light, on the visible spectrum, on the diodes. The diodes produce a voltage when the light energy is received. A voltage signal generated by the linear diode array 300 is provided to a signal processor 400 connected to the linear diode array 300. The signal processor 400 amplifies, multiplexes, and converts the voltage signal to a digital signal representative of the representing the penetration characteristics of the beam of radiation 105 up to the point where the measurement is taken.

Figure 3:
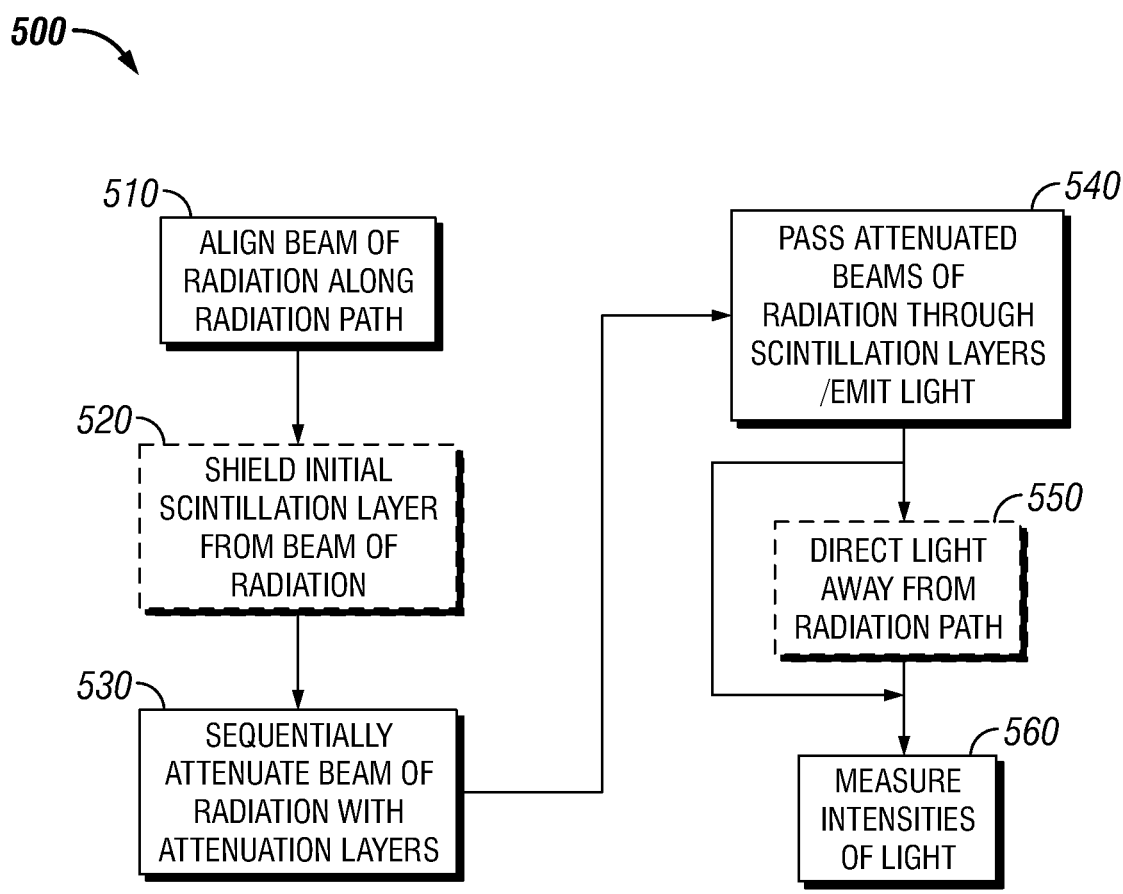
FIG. 3 is a flowchart illustrating an embodiment of a method of conducting x-ray spectrometry.
Figure 4:
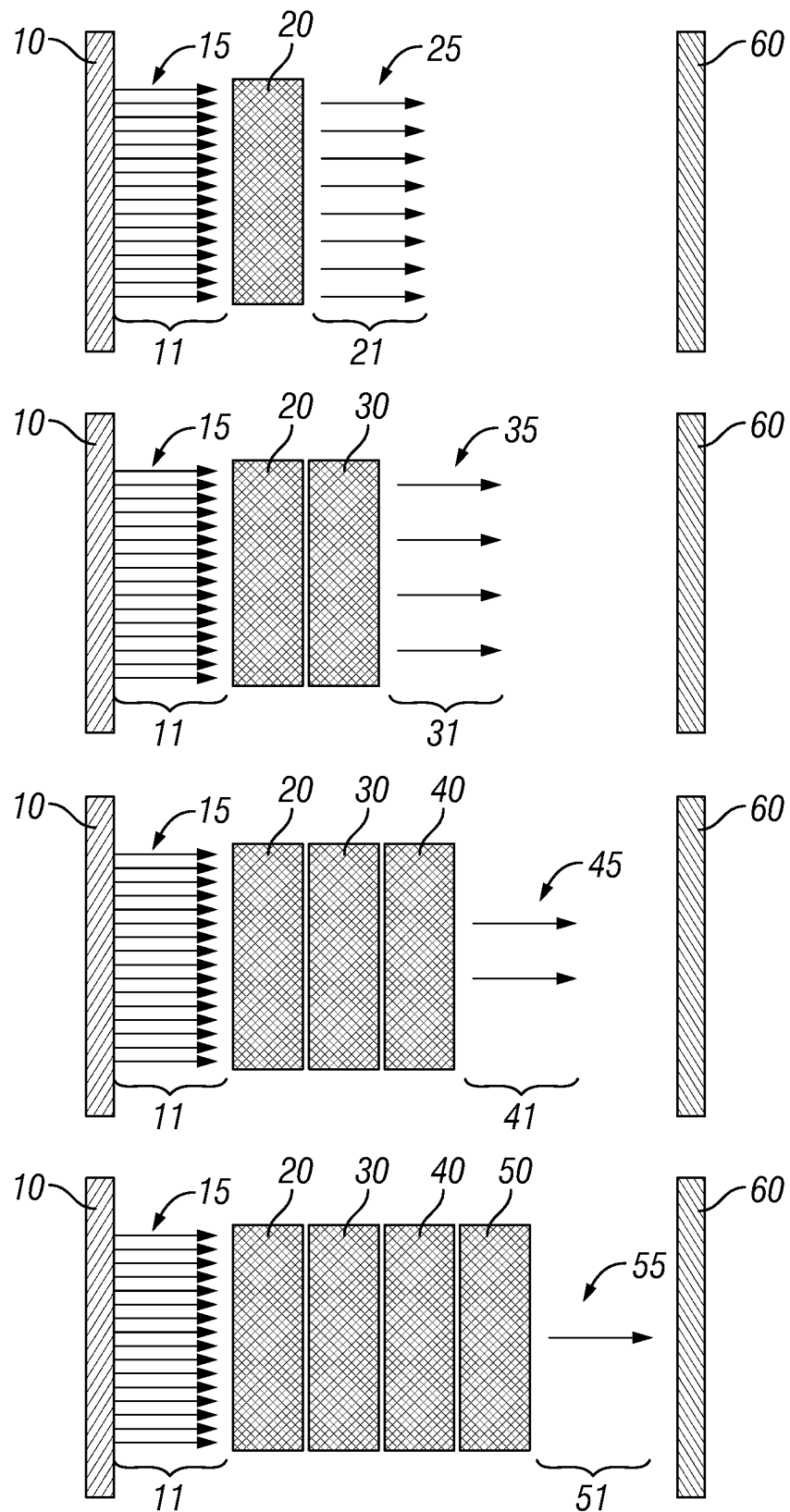
FIG. 4 illustrates a known method of measuring the penetration characteristics of an x-ray spectra.
Figure 5:
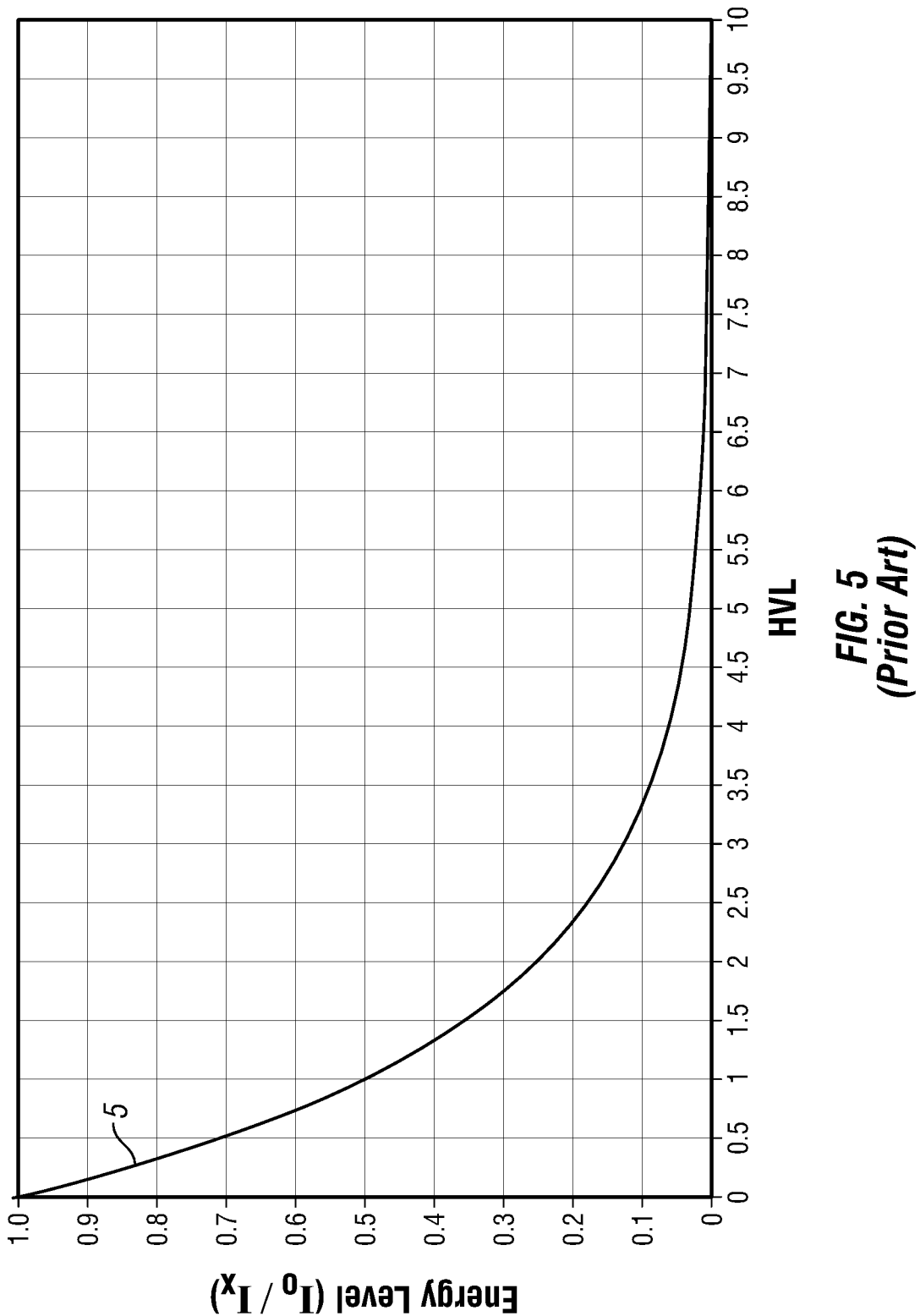
FIG. 5 shows a graph of the HVL in relation to the ratio of the initial intensity $I_0$ to the attenuated intensity $I_x$.

FIG. 3 is a flowchart illustrating an embodiment of a method 500 of conducting x-ray spectrometry. The method 500 includes aligning a beam of radiation along a radiation path in Action 510 and attenuating the beam of radiation by interaction with a plurality of attenuation layers to form a plurality of attenuated beams along the radiation path in Action 530. The attenuated beams are sequentially attenuated. As the beam of radiation passes along the radiation path, the beam of radiation is attenuated into an attenuated beam by interaction with an attenuation layer. That attenuated beam is then further attenuated by interaction with a subsequent attenuation layer along the radiation path. Therefore, each subsequent attenuated beam is attenuated more than the prior attenuated beam along the radiation path.

The attenuated beams of radiation are passed through scintillation layers in Action 540. As each of the plurality of attenuated beams pass through their respective scintillation layer, the scintillation layers each emit light. In Action 560, the intensities of the lights are measured. The respective intensity of each of the lights may be measured without moving the plurality of attenuation layers with respect to the radiation path. The respective intensity of each of the lights may be measured simultaneously. The beam of radiation (or the attenuated portion thereof) may be sequentially passed through at least eight scintillation layers, at least eight light diffuser layers, and at least eight attenuation layers and the measurements of at least eight intensities may be taken. The beam of radiation (or the attenuated portion thereof) may be sequentially passed through twelve or less scintillation layers, twelve or less light diffuser layers, and twelve or less attenuation layers and the measurements of twelve or less intensities may be taken.

In some embodiments, method 500 includes Action 520 of shielding the spectrometer such that the scintillation screen of the initial scintillation layer does not become oversaturated. The beam of radiation may pass through a shielding layer before being passed through an initial scintillation layer and the subsequent attenuation layers.

Method 500 may include Action 550 of directing the light emitted from the scintillation layers away from the radiation path before the light is measured. The light emitted from the scintillation layers may be directed away from the radiation path via respective light diffuser layers. In some embodiments, the sequentially attenuated beam of radiation forms a last attenuated beam by interacting with a final attenuation layer. The last attenuated beam is passed through a last scintillation layer to produce light. However, a light diffuser layer may not be present after the last scintillation layer and the intensity of radiation that is transmitted through the final attenuation layer may be measured in alignment with the radiation path.

Referring again to FIG. 1, by way of example, a beam of radiation 105 may be aligned with an x-ray spectrometer 100. The beam of radiation 105 is a collimated beam of radiation. The beam of radiation 105 may be a fan beam, a pencil beam, or a cone beam. In other embodiments, the beam of radiation 105 may be a shape other than a fan beam, a pencil beam, or a cone beam. The beam of radiation 105 passes through the first attenuation layer 111. The thickness and density of the first attenuation layer 111 reduces the intensity of the radiation of the beam of radiation 105 so that the first scintillation layer 121 does not become saturated. Energy from the portion of the beam of radiation 105 reaching the first scintillation layer 121 is converted into light, redirected by the first light diffuser layer 131 and media 200 into the linear diode array 300. A signal processor 400 converts the measurements of the linear diode array 300 into a signal representing the penetration characteristics of the beam of radiation 105 through the first attenuation layer 111. An attenuated portion of the beam of radiation 105 continues through the second layer group 142 where the penetration characteristics of the beam of radiation 105 through the first attenuation layer 111 and second attenuation layer 112 is determined. Each time the beam of radiation 105 passes through one of the attenuation layers 111-119, less of the radiation is transmitted and the penetration characteristics of the beam of radiation 105 through that attenuation layer is determined.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. An x-ray spectrometer comprising:
a plurality of attenuation layers;
a plurality of scintillation layers;
a plurality of light diffuser layers, wherein radiation that passes through each of the plurality of attenuation layers interacts with a respective one of the plurality of scintillation layers and emits a light that is redirected by a respective one of the plurality of light diffuser layers; and
one or more cameras positioned to measure light emitted from each of the plurality of scintillation layers and redirected by the plurality of light diffuser layers.

2. The x-ray spectrometer of claim 1, wherein the plurality of scintillation layers comprises at least eight scintillation layers, the plurality of attenuation layers comprises at least eight attenuation layers, and the plurality of light diffuser layers comprises at least eight light diffuser layers.

3. The x-ray spectrometer of claim 2, wherein the plurality of scintillation layers comprises twelve or less scintillation layers, the plurality of attenuation layers comprises twelve or less attenuation layers, and the plurality of light diffuser layers comprises twelve or less light diffuser layers.

4. The x-ray spectrometer of claim 1, wherein the plurality of attenuation layers includes a first attenuation layer that is not directly adjacent to any of the plurality of light diffuser layers, the first attenuation layer being configured to reduce an intensity of radiation to a level below a saturation threshold of a scintillation layer of the plurality of scintillation layers that is adjacent to the first attenuation layer.

5. The x-ray spectrometer of claim 4, wherein the first attenuation layer has a greater linear attenuation coefficient than the other layers of the plurality of attenuation layers.

6. The x-ray spectrometer of claim 4, wherein the first attenuation layer has a greater thickness than the other layers of the plurality of attenuation layers.

7. The x-ray spectrometer of claim 4, wherein the first attenuation layer is interchangeable with a shielding layer having a greater thickness than each of the plurality of attenuation layers.

8. The x-ray spectrometer of claim 1, wherein each of the plurality of light diffuser layers includes a first face, a second face, and a side, the first face oriented towards an adjacent one of the plurality of scintillation layers, the second face oriented away from the adjacent one of the plurality of scintillation layers, the second face being opposite the first face, wherein light from the adjacent one of the plurality of scintillation layers is redirected through the side of the light diffuser layer.

9. The x-ray spectrometer of claim 8, wherein the light from the adjacent one of the plurality of scintillation layers is redirected through the side of the light diffuser layer at approximately 90 degrees from the first face of the light diffuser layer.

10. The x-ray spectrometer of claim 8, wherein the one or more cameras is a linear diode array positioned to measure light redirected by each of the plurality of light diffuser layers.

11. An x-ray spectrometer comprising:
a radiation path extending from a start point to an end point;
a first layer group oriented along the radiation path, the first layer group including a first scintillation layer and a first light diffuser layer, the first scintillation layer being closer to the start point than the first light diffuser layer, the first light diffuser layer is configured to direct light emitted from the first scintillation layer away from the radiation path;
a second layer group oriented along the radiation path, the second layer group including a second attenuation layer, a second scintillation layer, and a second light diffuser layer, the second attenuation layer being closer to the start point than the second scintillation layer, the second scintillation layer being closer to the start point than the second light diffuser layer, the first layer group being closer to the start point than the second layer group, the second light diffuser layer is configured to direct light emitted from the second scintillation layer away from the radiation path; and
a third layer group oriented along the radiation path, the third layer group including a third attenuation layer, a third scintillation layer, and a third light diffuser layer, the third attenuation layer being closer to the start point than the third scintillation layer, the third scintillation layer being closer to the start point than the third light diffuser layer, the second layer group being closer to the start point than the third layer group, the third light diffuser layer is configured to direct light emitted from the third scintillation layer away from the radiation path.

12. The x-ray spectrometer of claim 11, wherein the first layer group includes a first attenuation layer closer to the start point than the first scintillation layer.

13. The x-ray spectrometer of claim 12, wherein the first attenuation layer is interchangeable with another first attenuation layer having a greater thickness than the first attenuation layer.

14. The x-ray spectrometer of claim 11, further comprising one or more cameras positioned to measure light redirected by the first light diffuser layer, light redirected by the second light diffuser layer, and light redirected by the third light diffuser layer.

15. The x-ray spectrometer of claim 14, wherein the first light diffuser layer is configured to redirect light more than 45 degrees away from the radiation path.

16. The x-ray spectrometer of claim 15, wherein the first light diffuser layer is configured to redirect light perpendicular to the radiation path.

17. The x-ray spectrometer of claim 14, wherein the one or more cameras is a linear diode array positioned to measure light redirected by the first light diffuser layer, light redirected by the second light diffuser layer, and light redirected by the third light diffuser layer.

18. A method of conducting x-ray spectrometry, the method comprising:
aligning a beam of radiation along a radiation path;
attenuating the beam of radiation by interaction with a plurality of attenuation layers to form a plurality of attenuated beams along the radiation path, the plurality of attenuated beams being sequentially attenuated such that a prior attenuated beam of radiation of the plurality of attenuated beams is further attenuated by a respective one of the plurality of attenuation layers to produce a subsequent attenuated beam of radiation of the plurality of attenuated beams;
passing the plurality of attenuated beams through a plurality of scintillation layers, each of the plurality of attenuated beams passing through a respective one of the plurality of scintillation layers, the plurality of scintillation layers emitting a plurality of lights, each of the plurality of lights being emitted by a respective one of the plurality of scintillation layers; and
measuring a respective intensity of each of the plurality of lights.

19. The method of claim 18, further comprising directing each of the plurality of lights away from the radiation path.

20. The method of claim 19, wherein a thickness of each of the plurality of attenuation layers is uniform.

21. The method of claim 19, wherein measuring the respective intensity of each of the plurality of lights comprises measuring the respective intensity of each of the plurality of lights without moving the plurality of attenuation layers.

22. The method of claim 19, wherein measuring the respective intensity of each of the plurality of lights comprises simultaneously measuring the respective intensity of each of the plurality of lights.

23. The method of claim 22, wherein the respective intensity of each of the plurality of lights is measured simultaneously with a linear diode array.

24. The method of claim 19, wherein the plurality of attenuation layers comprises at least eight attenuation layers and measuring the respective intensity of each of the plurality of lights comprises measuring at least eight intensities of lights emitted by the plurality of scintillation layers.

25. The method of claim 19, wherein each of the plurality of lights is directed away from the radiation path via a respective light diffuser layer.

26. The method of claim 19, further comprising:
passing the beam of radiation through an initial scintillation layer before attenuating the beam of radiation by interaction with the plurality of attenuation layers; and
shielding the initial scintillation layer from the beam of radiation such that an intensity of the beam of radiation received by the initial scintillation layer is below a saturation threshold of the initial scintillation layer.

27. The method of claim 26, further comprising:
attenuating further a last attenuated beam of radiation of the plurality of attenuated beams by interaction with a final attenuation layer; and
measuring an intensity of radiation transmitted through the final attenuation layer aligned with the radiation path.

* * * * *